United States Patent [19]

Strange

[11] 3,827,815
[45] Aug. 6, 1974

[54] SPRING CLIPS
[75] Inventor: John Strange, Cardiff, England
[73] Assignee: Firth Cleveland Fastenings Limited, Pontypridd, Glamorgan, England
[22] Filed: July 11, 1972
[21] Appl. No.: 270,783

[30] Foreign Application Priority Data
July 12, 1971  Great Britain................... 32534/71

[52] U.S. Cl............... 403/397, 403/400, 24/81 CR, 24/129 B
[51] Int. Cl............................................. F16b 7/04
[58] Field of Search............287/189.35, 189.36 A, 287/20.92 C, 20.924, 49, 51; 52/665; 24/81 CR, 81 B, 129 B, 30 TT; 248/300, 248/74 R, 61; 403/395, 396, 397, 400

[56] References Cited
UNITED STATES PATENTS
606,461   6/1898   Johnson............................... 287/49
2,685,720  8/1954   Petri............................... 24/81 B X Primary Examiner—James R. Boler
Assistant Examiner—Wayne L. Shedd
Attorney, Agent, or Firm—Teagno & Toddy

[57] ABSTRACT

A clip of resilient material, such as a strip of heat treated, high carbon steel, has inwardly directed terminal portions extending from the ends of two limbs which together form a substantially U-shaped structure. The limbs have aligned apertures and the terminal portions have mutually engageable fastening means, so that, when closed, the clip defines a frame-like structure which tightly and resiliently embraces and grips two bars, rods or like elongate members transversely of, e.g., at right angles to, each other. A typical application of the clip is an assembly of such elongate members defining a television aerial system.

5 Claims, 3 Drawing Figures

PATENTED AUG 6 1974 3,827,815

SPRING CLIPS

This invention relates to spring clips of the kind for securing together transversely of, e.g., at right angles to, each other, elongate members such as, for example, components of a television aerial system, and also to assemblies of such members secured together by such a clip or clips.

It is an object of the invention, to provide a spring clip for the above-mentioned purpose, which enables such members to be secured to each other more positively than is possible with clips previously used for the purpose.

According to a first aspect of the invention, in a spring clip for securing a first elongate member transversely of, e.g., at right angles to, a second elongate member, a first and a second limb portion are joined by a bight portion to form a substantially U-shaped structure therewith, the limb portions each having an aperture for accommodating a said first member and an inwardly directed terminal portion, the terminal portions being provided with mutually engageable fastening means adapted to secure the limb portions together by their terminal portions against a resilient bias tending to separate the latter, the arrangement being such that, when the terminal portions are so secured, the clip defines a closed frame-like structure adapted tightly to embrace a said second member whilst gripping a said first member in the said apertures.

According to a second aspect of the invention, an assembly of elongate members which are relatively transversely, disposed, e.g., at right angles to each other, has such members secured together by a clip or clips in accordance with the said first aspect of the invention.

Two forms of spring clip and assembly embodying the invention will now be described, by way of example, with reference to the accompanying drawings, in which.

Figure 1:
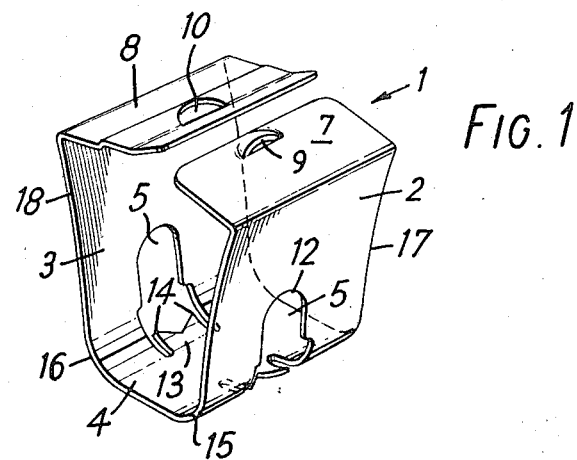
FIG. 1 shows a perspective view of a first said form of clip in its open or unstressed condition.

Referring to the drawings, the clip 1, which is made of a resilient material, for example a strip of heat treated, high carbon steel, has a first limb portion 2 and a second limb portion 3 joined by a bight portion 4, the said portions together forming a substantially U-shaped structure.

Figure 2:
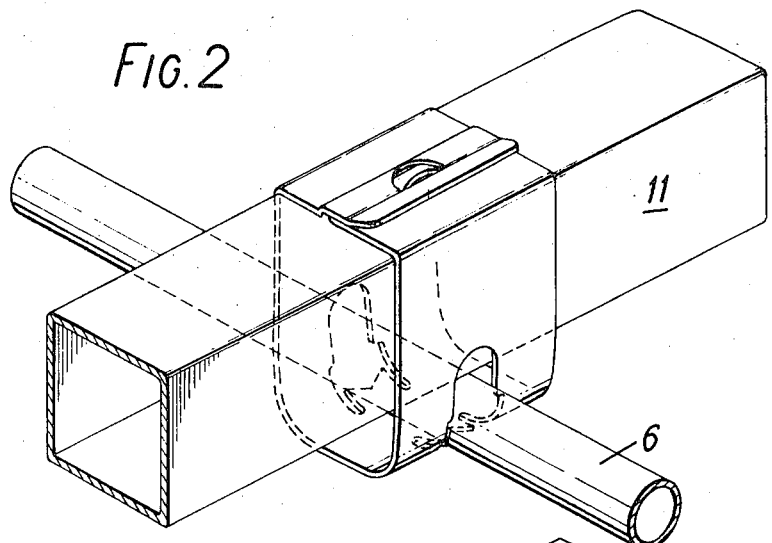
FIG. 2 shows a perspective view of a first said form of assembly which defines part of a television aerial system.
Figure 3:
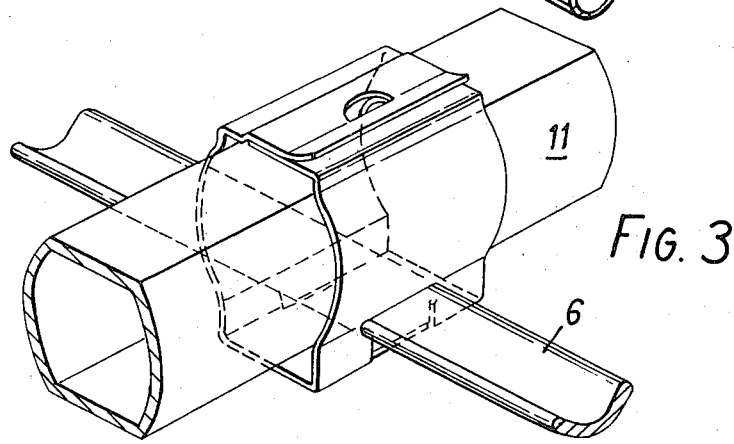
FIG. 3 shows a perspective view of a second said assembly, similar to that shown in FIG. 2 but comprising different shapes of elongate members and a correspondingly differently shaped clip.

The limb portions 2, 3 each have an aperture 5; as shown in FIGS. 2 and 3, these apertures accommodate a first elongate member forming part of the television aerial system which, in the case of the assembly shown in FIG. 2 is in the form of an aluminium tube 6 and in the case of the assembly shown in FIG. 3 in the form of a bar of somewhat kidney shaped cross-section.

The limb portions 2, 3 also have inwardly directed terminal portions 7, 8 which are provided with mutually engageable fastening means in the form of a detent 9, adapted, when the limb portons are urged towards each other against a resilient bias tending to separate them, to engage from below a semi-circular aperture 10.

To ensure such engagement, the terminal portions 7, 8 are, when in their overlapping position (FIGS. 2 and 3) biased towards each other by the resilience of the material, so as to make rubbing contact with each other prior to engagement of the fastening means 9, 10.

A second elongate member in the form of an aerial boom which, in the assembly shown in FIG. 2 is in the form of a square section aluminium tube 11 and in the case of the assembly shown in FIG. 3 in the form of a tube 11 of approximately rectangular cross-section but with two opposite convex arcuate sides 19, is, when the clip 1 is closed, tightly embraced by the clip which, in this condition, defines a closed frame-like structure.

Each of the apertures 5 is elongate, one end thereof being semi-circular, as shown at 12 and so dimensioned as to fit snuggly around the tube 6, whilst the other end thereof 13 is straight and provided with a pair of resilient barbs 14, which are clear of the tube 6 when the latter is inserted into the clip 1 whilst in the open condition, but dig into the member 6, so as to prevent it from moving axially, when the clip is closed; for this purpose, the apertures 5 extend, it will be noted, some way into the bight portion 4.

The boom 11 is prevented from axial movement relative to the clip 1 by friction. It will be noted that the members 6 and 11 are not only tightly embraced by, and in intimate contact with, the clip 1, but also resiliently pressed against each other.

The desired resilience or spring pressure exerted by the clip 1 on the members 6 and 11 is provided partly by the radiused regions 15, 16 between the bight portion 4 and the limb portions 2, 3 and partly by the oppositely directed radiused regions 17, 18 of the limb portions themselves (FIG. 2 only), these last-mentioned regions providing not only the, or part of the, bias tending to separate the limb portions and urging the fastening means 9, 10 once engaged, to remain in engagement, but also a force on the boom 11, transversely thereof and tending to resist its axial movement relative to the clip 1.

From the examples shown, it will be apparent that an assembly embodying the invention could comprise members such as 6 and 11 of a variety of cross-sections and that they need not necessarily have the cross-sections shown in FIGS. 2 and 3.

Furthermore the members need not necessarily be disposed at right angles to each other; neither need they be straight.

As will be apparent to those skilled in the art, the clip according to the invention could readily be modified from the specific example illustrated to enable the construction of such alternative assemblies as hereinbefore suggested.

Apart from television aerial systems, many other fields of application of the clips and assemblies according to the invention could be envisaged, such as structural models, laboratory equipment and toys.

I claim:

1. A spring clip for releasably securing a first elongate member substantially transversely to a second elongate member, said clip comprising a substantially U shaped body having a pair of limb portions and a base portion therebetween, said limb portions each having an axially aligned aperture approximate the end closest the base for accommodating said first elongate member and a terminal portion extending inwardly from the other end thereof, said terminal portions including mutually engagable fastening means, said clip having a normally open position wherein said terminal portions are separated allowing said second elongate member to be received between the limbs of the U shaped body and a closed position wherein said limbs may be urged together to bring said terminal portions into mutual engagement forming a frame to surround and engage said second elongate member.

2. The clip of claim 1 wherein the periphery of at least one of said apertures includes at least one inwardly pointing barb, said barb adapted to move radially inwardly in respect to said aperture when said clip is urged from the open to the closed position to engage said first elongate member and axially fix said clip in respect thereto.

3. The clip of claim 2 wherein said body is made of a strip of heat treated, high carbon steel.

4. A spring clip according to claim 2 wherein the mutually engagable fastening means comprise a detent on one said terminal portions and a detent receiving cavity located in the other said terminal portions.

5. A spring clip according to claim 2, wherein each of said apertures for accommodating a said first member has a pair of said barbs at its end nearest to the base portion.

* * * * *